US008249625B1

(12) United States Patent
Jones et al.

(10) Patent No.: US 8,249,625 B1
(45) Date of Patent: Aug. 21, 2012

(54) METHOD AND SYSTEM FOR ROUTING POSITION-DETERMINING REQUESTS

(75) Inventors: Bryce A. Jones, Overland Park, KS (US); Rodney D. Nelson, Overland Park, KS (US); Mike P. McMullen, Leawood, KS (US); John R. Schuler, Sarasota, FL (US)

(73) Assignee: Sprint Spectrum L.P., Overland Park, KS (US)

( * ) Notice: Subject to any disclaimer, the term of this patent is extended or adjusted under 35 U.S.C. 154(b) by 311 days.

(21) Appl. No.: 12/610,905

(22) Filed: Nov. 2, 2009

(51) Int. Cl.
*H04W 24/00* (2009.01)
*G01S 19/48* (2010.01)
*G01S 3/02* (2006.01)

(52) U.S. Cl. .................. 455/456.2; 342/357.31; 342/463

(58) Field of Classification Search ............. 342/357.31, 342/451, 463–465; 455/456.2
See application file for complete search history.

(56) References Cited

U.S. PATENT DOCUMENTS

| 7,292,864 | B1 | 11/2007 | Al-Khashti et al. |
| 7,305,245 | B2 | 12/2007 | Alizadeh-Shabdiz et al. |
| 8,055,272 | B1 * | 11/2011 | Wilson ........................ 455/456.1 |
| 2006/0030337 | A1 * | 2/2006 | Nowak ........................ 455/456.2 |

OTHER PUBLICATIONS

Unpublished U.S. Appl. No. 12/343,046, filed Dec. 23, 2008, Jones et al., "Method and System for Proving Location-Based Services Based on Location Request History".
Unpublished U.S. Appl. No. 11/786,823, filed Apr. 13, 2007, Scott Wilson, "Method and System for Adjusting Processing Duration in a Position-Determining System".

* cited by examiner

*Primary Examiner* — Jack W Keith
*Assistant Examiner* — Fred H Mull

(57) ABSTRACT

A method and system for routing position-determining requests to position-determining platforms. The method includes receiving into a position-determining system a position-determining request specifying a given processing-duration within a given range. The processing-duration defines a maximum amount of time that the system should spend determining position and thereby defines a corresponding granularity of position-determination by the system. All processing-durations in the given range, although different from each other, define the same corresponding granularity of position-determination by the system. The method further includes the system selecting, based on which processing-duration of the range the given processing-duration is, a position-determining platform of the plurality to process the received position-determining request. The method then includes routing the received position-determining request to the selected position-determining platform for processing.

20 Claims, 4 Drawing Sheets

METHOD AND SYSTEM FOR ROUTING POSITION-DETERMINING REQUESTS

BACKGROUND

An important feature of contemporary cellular wireless networks is the ability to locate the geographical position of a mobile station. This capability was initially developed to assist emergency services in locating mobile stations. However, the availability of position information to support 911 services has given rise to the development of many other location-based-service (LBS) applications as well.

For instance, given the position of a mobile station, an LBS provider (e.g., a wireless service provider or third party) can provide the mobile-station user with a weather or traffic report pertaining to the user's vicinity. As another example, an LBS provider can report a list of services or establishments (e.g., restaurants, parks, or theatres) in the user's vicinity. As still another example, an LBS provider can provide a mobile-station user with a map of the user's position and/or with directions for travel between the user's position and another location. As yet another example, knowing that a mobile station is operating in a particular position, an LBS provider can send the mobile station a location-based message, such as an advertisement or coupon for a nearby establishment. Other LBS applications exist currently, and more will surely be developed in the future.

In practice, when an LBS application wants to determine the position of a mobile station, the application may send a position-determining request message to the wireless carrier that serves the mobile station. In response, the carrier may then send a signaling message through its network to determine where the mobile station is currently located. A position-determining platform operated by the wireless carrier or a third party vendor may assist in the position-determination. After determining the position of the mobile station, the wireless carrier may then generate a response to the position-determining request and send that response to the LBS application.

Overview

Disclosed herein is a method and system for routing position-determining requests to position-determining platforms.

In general, a position-determining system may use various different techniques or processes to determine the position of a mobile station, with some processes resulting in more or less granular position determination than others. For example, the position-determining system may determine the position of a mobile station with a fairly high degree of granularity by using the Global Positioning System (GPS). To do so, the system may engage in signaling with the mobile station to direct the mobile station to tune to particular satellites in the sky over the mobile station so as to receive signaling information from those satellites, and the system may then use that information to compute the mobile station's location with great precision. As another example, the system may determine the position of a mobile station with fairly low granularity through an Advanced Forward Link Trilateration (AFLT) process, by estimating the mobile station's location based on signals that the mobile station receives from nearby cellular base stations. To do so, the system may engage in signaling with the mobile station to receive from the mobile station information regarding such base station signals, and the system may apply a basic triangulation algorithm to approximate the mobile station's location based on that information. And as yet another example, the system may use some combination of these processes, as a hybrid AFLT/GPS process. And as still yet another example, the system may refer to a database that includes data indicating, for example, the location of a cell-system or cell-site in which the mobile station was most recently registered.

In practice, it will usually take the position-determining system more time to process a position-determining request at a higher level of granularity than to process a position-determining request at a lower level of granularity. For instance, to determine the position of a mobile station using GPS, it may take the system on the order of 10 seconds, considering the time involved in back-and-forth signaling between the system and the mobile station and in the mobile station tuning to appropriate satellites and obtaining appropriate information for use by the system. On the other hand, to determine the position of a mobile station through AFLT, it may take the system just on the order of 1-3 seconds, as it is more of a simple matter for the system to obtain and use base station signal measurements from the mobile station.

To facilitate position determination at a desired level of granularity, each position-determining request sent to the position-determining system may include data that specifies a processing-duration, and the system may use up to that specified duration to determine the requested position. By default, the system may attempt to determine position at a high level of granularity using the GPS process. However, if the specified duration does not allow for that, the system may then resort to a process that provides a next lower level of granularity, such as a hybrid AFLT/GPS process. And if the duration still does not allow for that, the system may then resort to a process that provides a still lower level of granularity, such as a simple AFLT process. And if the duration still does not allow for that, the system may then resort to a process that provides a still a lower level of granularity, such as referring to a database that includes data indicating where the mobile station was most recently registered. Thus, the duration specified by a position-determining request may effectively designate which position-determining process is to be used and thus what level of granularity is desired. By designating a longer allowed duration, a position-determining request may effectively seek highly granular position determination (such as GPS position), whereas by designating a shorter allowed duration, a position-determining request may effectively seek a coarse position determination (such as AFLT position).

With this arrangement, it turns out that there are certain ranges of processing-duration in which all processing-durations will tend to result in the same granularity of location determination. For instance, any position-determining requests that designate an allowed processing-duration in the range of 1 to 3 seconds may tend to result in AFLT position determination. Whereas, any position-determining requests that designate an allowed processing-duration in the range of 9 to 11 seconds may tend to result in GPS position determination.

In practice, each of several position-determining platforms in a wireless carrier's position-determining system may be capable of applying the same position-determining processes. For instance, multiple platforms in the system may each be capable of GPS position determining, hybrid AFLT/GPS position determining, and AFLT position determining. However, for one reason or another, it may sometimes be preferable to route a given position-determining request to a particular one of the platforms for processing. For instance, one of the platforms may be more expensive to operate but may provide better processing and results than another platform, and so it may be desirable to route especially important position-determining requests to that better platform but to route less important position-determining requests to another platform.

One way to facilitate select routing of position-determining requests to desired platforms in the position-determining system is to add to each request a designation of the desired system or a class of service indicator. However, the inventors have discovered that a more efficient way to facilitate such routing is by leveraging the allowed-duration data that is already included in position-determining requests.

As discussed above, the allowed-duration data in a position-determining request effectively functions today to establish which position-determining process will be applied. However, assuming that there are at least two platforms capable of carrying out that same position-determining process, the present method provides a mechanism to facilitate designation of which of those platforms should be used. In particular, the method takes advantage of the fact that, for each position-determining process, there is likely a range of allowed processing-durations.

According to the method, one or more duration values in the range will be set to correspond with one of the platforms capable of carrying out the associated position-determining process, whereas one or more other duration values in the range will be set to correspond with another one of the platforms capable of carrying out the associated position-determining process. Thus, a position-determining request may then effectively select a desired position-determining platform by simply designating a corresponding allowed processing-duration from among those in the range.

For instance, if a wireless carrier's position-determining system has three platforms A, B, and C that are each capable of determining GPS position, and if designation of any allowed processing-duration in the range of 9 to 11 would result in application of GPS position determination, then a position-determining request that seeks GPS position determination may designate (i) an allowed processing-duration of 9 in order to select platform A, (ii) an allowed processing-duration of 10 in order to select platform B, or (iii) an allowed processing-duration of 11 in order to select platform C. Likewise, if platforms A, B, and C are also capable of AFLT position determination, and if any designation of allowed processing-duration in the range of 1 to 3 would result in application of AFLT position determination, then a position-determining request that seeks AFLT position determination may designate (i) an allowed processing-duration of 1 in order to select platform A, (ii) an allowed processing-duration of 2 in order to select platform B, or (iii) an allowed processing-duration of 3 in order to select platform C. Of course, other integer and non-integer values could be used as well.

A position-determining system operating according to an example method will receive a plurality of position-determining requests, and each of these requests will specify a processing-duration that defines a maximum amount of time that the system should spend determining position, such that the request thereby defines a corresponding desired granularity of position-determination by the system. As explained above, all processing-durations in a given range, although different from each other, will define the same corresponding desired granularity of position-determination by the system. According to the example method, the position-determining system receives a position-determining request specifying a given processing-duration within a given range. Based on which processing-duration of the range the given processing-duration is, the system then selects a position-determining platform of the plurality to process the received position-determining request. After selecting the position-determining platform, the position-determining system routes the received position-determining request to the selected position-determining platform for processing.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

DETAILED DESCRIPTION OF EXEMPLARY EMBODIMENTS

1. Introduction

As noted above, the disclosed method and system provide for routing position-determining requests to various position-determining platforms by leveraging allowed-duration data that is included in position-determining requests. Beneficially, a system operating in accordance with the exemplary method may allow a wireless service provider to distribute position-determining requests seeking the same level of granularity to desired position-determining platforms. The disclosed method may be of a particular benefit to a requesting entity (e.g., a user of a given mobile station, the wireless service provider, or a third-party location-based-service provider) that may prefer, for one reason or another, that a given position-determining request be sent to a particular, desired position-determining platform.

2. Exemplary Communication System Architecture

Figure 1:
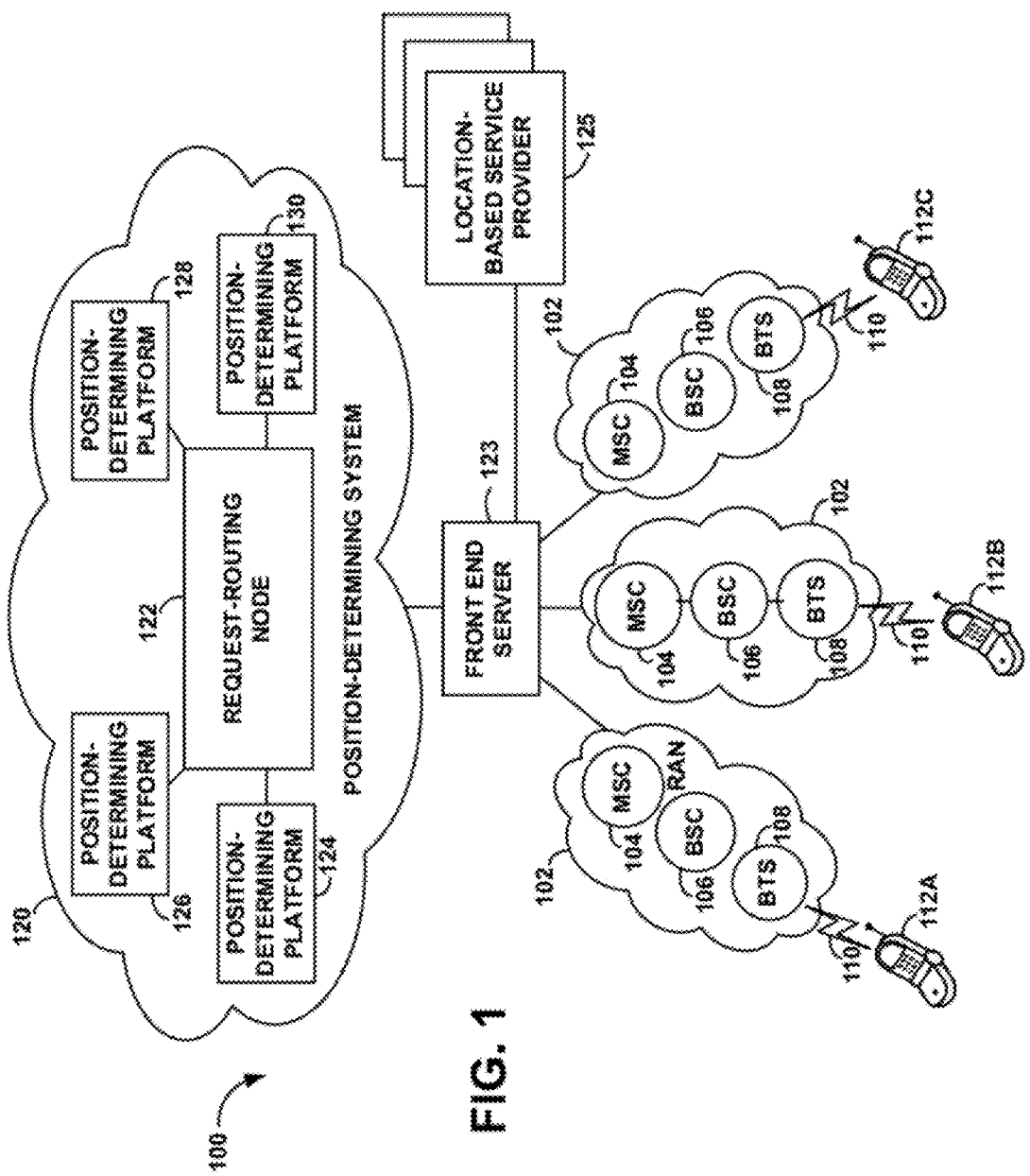
FIG. 1 is a simplified block diagram of a communication system in accordance with exemplary embodiments.

FIG. 1 is a simplified block diagram of a communication system in which the proposed methods can be implemented. It should be understood that this and other arrangements described herein are set forth only as examples. As such, those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. In addition, various functions described herein as being performed by one or more entities may be carried out by hardware, firmware, and/or software. For instance, various functions may be carried out by a processor executing program instructions stored in memory or another machine-readable medium.

System 100 includes a number of radio access networks (RANs) 102, each of which is controlled by a switching entity such as a mobile switching center (MSC) 104. The MSC generally includes or connects with one or more base station controllers (BSCs) 106, which in turn connect with one or more base transceiver stations (BTSs) 108. Each BTS may include a cell tower with one or more antennas that radiate to define an air interface 110 in which mobile stations can operate. With this arrangement, mobile stations, such as mobile stations 112, can communicate through RAN 102 with entities on a transport network such as a public switched telephone network (PSTN) or the Internet.

Mobile stations 112 can take various forms, examples of which include a mobile phone, a personal digital assistant, a wirelessly equipped personal computer, or another wirelessly equipped device of any sort. Each RAN 102 generally functions to serve wireless mobile stations such as mobile station 112 and/or other mobile stations, so as to provide those devices with resources such as the ability to communicate with other entities (or with each other) via the RAN. As such, each RAN 102 may take various forms, the details of which are not critical and may depend on the air-interface protocol of the RAN 102 and on other factors.

System 100 also includes a position-determining system 120 that is operable to facilitate determination of the position of mobile stations operating in the wireless network. The position-determining system includes a request-routing node 122 and a plurality of position-determining platforms, such as position-determining platforms 124, 126, 128, and 130. Fewer or additional position-determining platforms are possible as well, and the request-routing node 122 may itself be a position-determining platform. Position-determining system 120 may also include various other entities that are operable to facilitate position-determination.

The position-determining platforms in position-determining system 120 may be operated by various entities. For instance, each position-determining platform may be operated by the wireless carrier serving mobile stations 112 or a vendor that may charge the wireless carrier for use of the position-determining platform. The position-determining platforms may be operated by the same entity. Alternatively, the position-determining platforms may be operated by different entities. Other examples are possible as well.

The system 100 also includes a front end server 123 that acts as a front end for receiving position-determining requests from requesting entities and forwarding those requests to the request-routing node 122. When the front end server 123 receives from a requesting entity a position-determining request seeking the position of a mobile station, the server 123 may send the request to the request-routing node 122. The node 122 may then route the request to a position-determining platform, and the platform may then, in turn, determine the position of the mobile station. The requesting entity that sends the position-determining request to the front end server 123 could be a mobile station seeking its own position. For example, mobile station 112A may be operating a location-based service (LBS) application, and the mobile station may need to determine its own position for the LBS application. Alternatively, the requesting entity could be an entity seeking the position of another entity. For example, a location-based service provider 125 may be seeking the position of a mobile station operating in the wireless network, such as mobile station 112A, 112B, or 112C.

After determining the position of the mobile station for which position determination is requested, the position-determining system 120 may return the determined position of the mobile station to the front end server 123. The front end server 123 may then return to the requesting entity the determined position or data derived from the determined position (such as mapping, routing, or street-address information).

As mentioned above, various position-determining processes may be used to process position-determining requests. Example position-determining processes include a GPS position-determining process, an AFLT position-determining process, a hybrid GPS/AFLT position-determining process, and a position-determining process that involves determining the location of the cell-system or cell-site in which a mobile station was most recently registered (e.g., by referring to a database that includes data indicating such information). Other position-determining processes may be used as well, including those that may be developed in the future.

Platforms 126-130 may each be capable of using a plurality of position-determining processes to process position-determining requests. For example, each platform may be capable of using both a GPS position-determining process and an AFLT position-determining process. Alternatively, some of these platforms may be specialized platforms that are each only capable of using a single position-determining process. For example, position-determining platform 124 may only be capable of using a GPS position-determining process, and position-determining platform 126 may only be capable of using an AFLT position-determining process. Other examples are possible as well.

3. Exemplary Request-Routing Node Components

Figure 2:
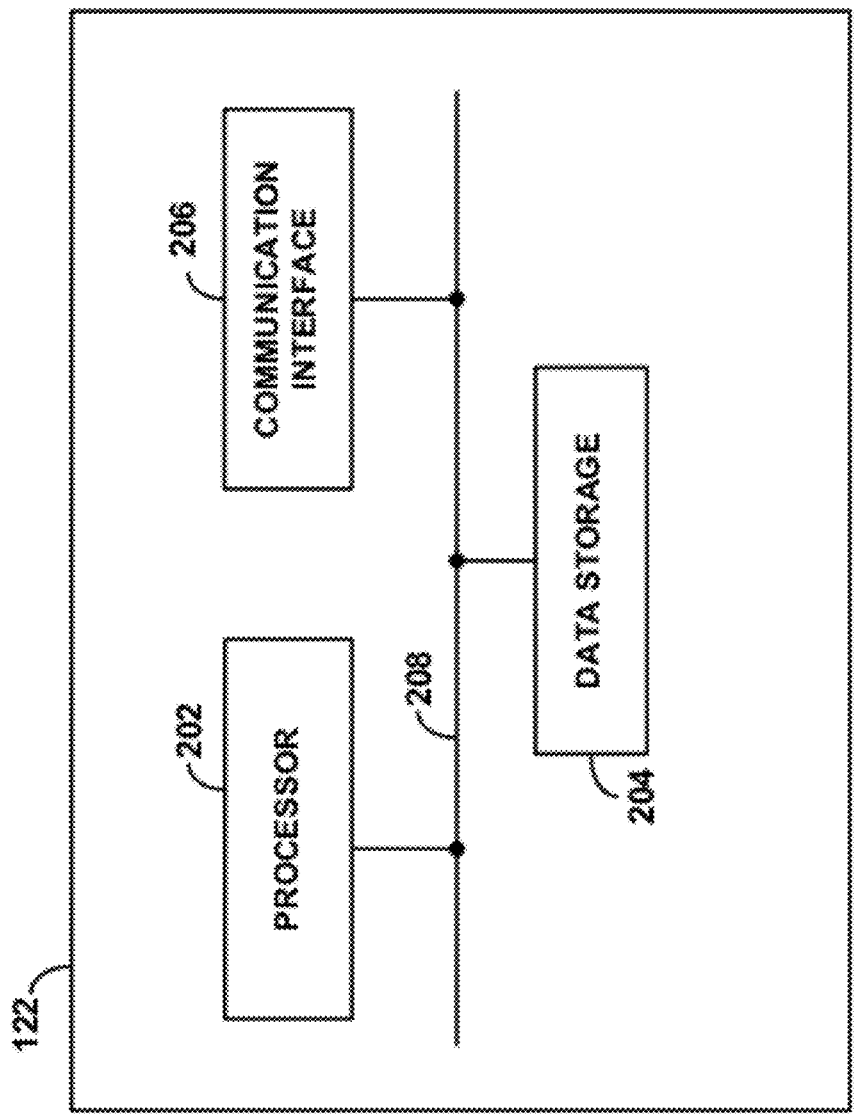
FIG. 2 is a simplified block diagram of an exemplary request-routing node that can be used in the arrangement of FIG. 1.

FIG. 2 is a block diagram of an exemplary request-routing node 122, illustrating some of the components that could be included in such a node to carry out the disclosed method. As shown in FIG. 2, the request-routing node 122 may include a processor 202, data storage 204, and a communication interface 206, all of which may be coupled together by a system bus or other mechanism 208.

Each of these components of the request-routing node 122 may take various forms. For instance, processor 202 could be one or more general purpose microprocessors and/or dedicated signal processors. Data storage 204 could be volatile and/or nonvolatile memory, such as flash memory. The communication interface 206 could include one or more antennas, chipsets, and/or other components for communicating with other entities in the wireless network. The request-routing node 122 could communicate through communication interface 206 with, for example, front end server 123 and position-determining platforms 124, 126, 128, and 130.

In an example of the disclosed method, data storage 204 may include correlation data that correlates given processing-durations with given position-determining platforms. Data storage 204 also may include a set of logic (e.g., computer instructions) executable by processor 202 to carry out various functions described herein. For example, responsive to the request-routing node 122 receiving a position-determining request specifying a given processing-duration, processor 202 could determine the specified processing-duration. Processor 202 could then select, based on an analysis of the correlation data stored in data storage 204 and the specified processing-duration, a position-determining platform to process the received position-determining request. In some embodiments of the disclosed method, one or more of these functions can be carried out by firmware and/or hardware.

4. Exemplary Operation

Figure 3:
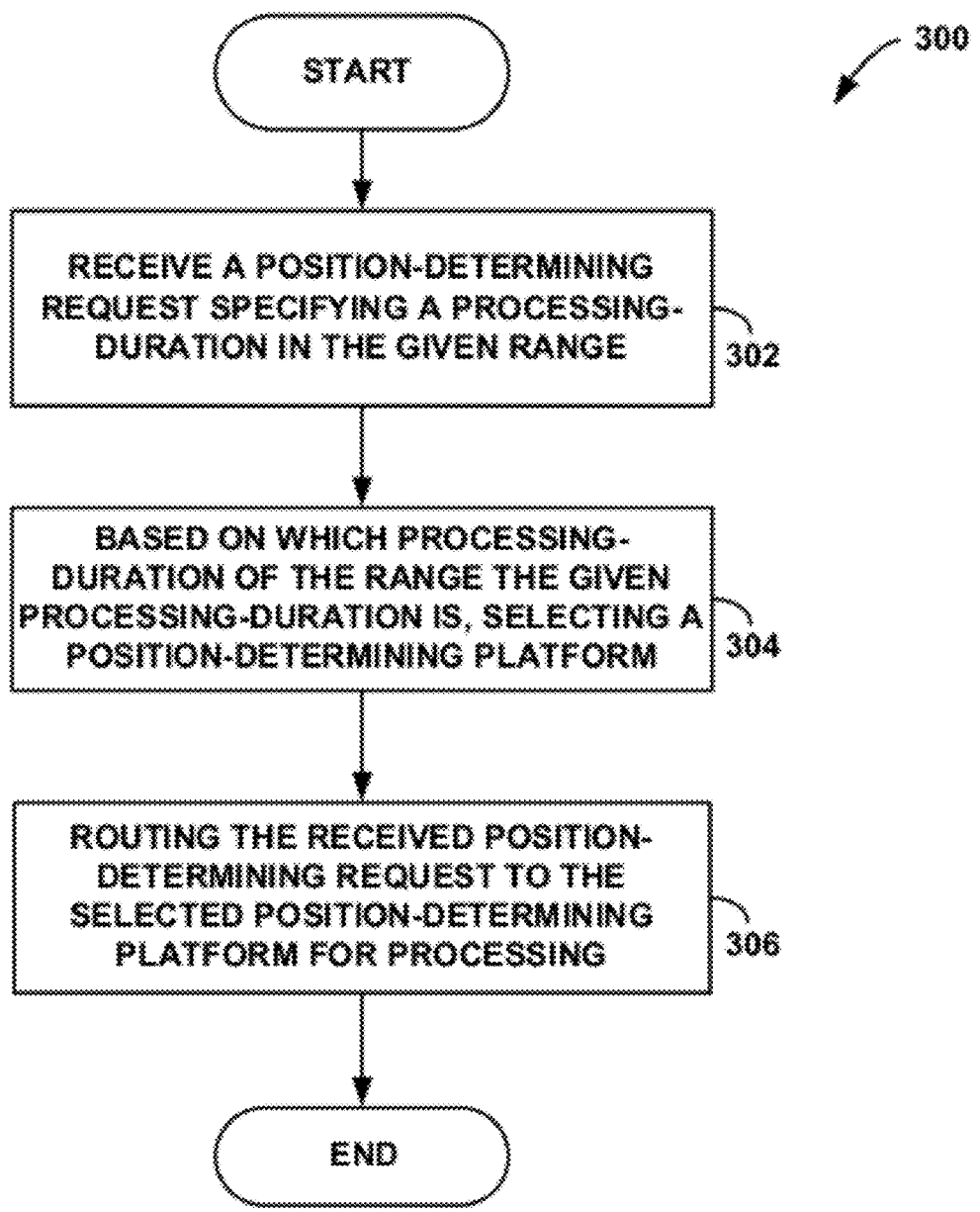
FIG. 3 is a flow chart of a method that can be carried out in accordance with exemplary embodiments.

Referring next to FIG. 3, a flow chart is provided to help illustrate some of the functions that can be carried out by a position-determining system in a wireless communication system, such as the position-determining system 120 depicted in FIG. 1. Method 300 is a method for routing position-determining requests to position-determining platforms. In this method, each of a plurality of position-determining requests received by the system 120 specifies a processing-duration that defines a maximum amount of time that the system 120 should spend determining position. This processing-duration thereby defines a corresponding granularity of position-determination by the system 120. All processing-durations in a given range, although different from each other, define the same corresponding granularity of position-determination by the system 120.

As shown in FIG. 3, method 300 begins at step 302, where the position-determining system 120 receives a position-determining request specifying a given processing-duration within the given range. At step 304, based on which processing-duration of the range the given processing-duration is, the system 120 selects a position-determining platform of the plurality to process the received position-determining request. Then, at step 306, the system 120 routes the received position-determining request to the selected position-determining platform for processing. These steps are further described in the following subsections.

i. Receiving the Position-Determining Request Specifying a Given Processing-Duration within the Given Range At step 302, the position-determining system 120 receives a position-determining request specifying a given processing-duration within the given range. In particular, the request-routing node 122 could receive the position-determining request from the front end server 123. As mentioned above, a requesting entity could send the position-determining request to the front end server 123, and the position-determining request could be a request for a position of a mobile station, such as mobile station 112A.

The position-determining request received at step 302 specifies a given processing-duration within a given range. The processing durations in a given range may include integer durations (e.g., 15, 16, and 17) and/or non-integer durations (e.g., 15.1, 15.2, 15.3, and so forth). Further, all processing-durations in this given range, although different from each other, define the same corresponding granularity of position-determination by the system 120. Many different example ranges that meet this criterion are possible. Given that position-determining system 120 may determine position with varying degrees of granularity and that different granularities generally take different amounts of processing time, different ranges of processing-duration will define different levels of granularity. For example, a first range may define a first granularity, and a second non-overlapping range may define a second granularity. Further, a plurality of ranges that define the same granularity are also possible. For example, a broad range may define a first granularity, and this broad range be broken down into a plurality of more specific ranges. Each of the plurality of the more specific ranges will necessarily define the same granularity as the broad range. Various examples of possible process-duration ranges are described in more detail below.

A. Example Processing-Duration Ranges that Define a Level of High Granularity

The given processing-duration range may be a range that defines a level of high granularity. The level of high granularity may be, for instance, a granularity of GPS-specific location. As discussed above, to determine the position of a mobile station using GPS, it may take system 120 on the order of 10 seconds. Accordingly, example ranges that may define a level of high granularity include, for instance, 8-11 seconds, 12-15 seconds, 16-20 seconds, and 21-30 seconds. In each of these examples, each processing-duration in the range defines a high granularity of position-determination by system 120. Many other examples are possible as well.

Further, it should be understood that ranges may span any number of processing durations. Generally, the given processing-duration range that defines a level of high granularity may be a range that spans X seconds, where X is an integer or non-integer. For example, the given processing-duration range may be a range that spans 0.5 seconds, 2 seconds, 4.5 seconds, or 10 seconds. Many other example lengths of possible ranges are possible as well.

B. Example Processing-Duration Ranges that Define a Level of Low Granularity

Alternatively, the granularity defined by the processing-duration may be a level of low granularity. The level of low granularity of position-determination may be a general location of a mobile station, such as the location of the cell-system the mobile station is operating in, the location of the cell-site the mobile station is operating in, and/or the location of the cell/sector the mobile station is operating in. Other examples of levels of low granularity are possible as well. Various position-determining processes may result in position-determination results that are in a level of low granularity.

An example processing-duration range that may define a level of low granularity is 0-4 seconds. Other ranges are possible as well, such as 0-1 seconds, 2-3 seconds, and 3-4 seconds. Similar to possible ranges of processing-durations that define a level of high granularity, the range of processing-durations that define a low level of granularity may be a range that spans X seconds, where X is an integer or non-integer.

C. Example Processing-Duration Ranges that Define a Level of Mid-Level Granularity As yet another alternative, the granularity defined by the processing-duration may be a level of granularity that is between a low level and a high level of granularity. Such granularities are herein referred to as mid-level granularities. An example position-determining processes that results in position-determination results that are of a mid-level granularity is a hybrid AFLT/GPS position-determining process. As mentioned above, by default, a position-determining system may attempt to determine position at a high level of granularity using the GPS process. However, if the specified duration does not allow for that, the system may then resort to a process that provides a next lower level of granularity, such as a hybrid AFLT/GPS process. Thus, in some cases, position-determining system 120 may attempt to determine position using the GPS process, but in order to not exceed the allowed processing duration, the system 120 resorts to using a hybrid AFLT/GPS position-determining process.

An example range that may result in a system attempting to use a GPS process but resorting to use a hybrid AFLT/GPS process (e.g., due to not having enough time to determine position using GPS) is 5-7 seconds. Other examples of processing-durations that result in a mid-level granularity are possible as well. Similar to possible ranges of processing-durations that define level of high and low granularity, the range of processing-durations that define a mid-level of granularity may be a range that spans X seconds, where X is an integer or non-integer.

D. The "Same Corresponding Granularity"

Whether position-determination results fall within "the same corresponding granularity" may depend on the specificity with which "the same corresponding granularity" is defined. In different examples of the disclosed method, "the same corresponding granularity" may be defined with varying degrees of specificity. Thus, it should be understood that two position-determination results need not be the exact same specificity (e.g., results both having position determined to a guaranteed accuracy of within X number of feet, such as 100 feet) in order to be results having the "same corresponding granularity."

As a particular example, "the same corresponding granularity" may be defined as a broad level of low granularity that includes granularities of cell-system-specific location, cell-site-specific location, and cell/sector-specific location. Alternatively, "the same corresponding granularity" may be defined more narrowly, such that granularities of cell-system-specific location, cell-site-specific location, and cell/sector-specific location do not qualify as "the same corresponding granularity." Rather, in this alternative example, a first "same corresponding granularity" may be defined as a granularity of cell-system-specific location, a second "same corresponding granularity" may be defined as a granularity of cell-site-specific location, and a third "same corresponding granularity" may be defined as a granularity of cell/sector-specific location. Other example specificities of the same corresponding granularity are possible as well.

Typically, all processing-durations in a range that defines a same granularity will result in the system using the same position-determining process. However, it should be understood that in some examples of the disclosed method, a given position-determining process may result in the same granularity as another position-determining process. For instance, in a situation where a low-level of granularity includes granularities of cell-system specific location to cell/sector-specific location, a plurality of position-determining processes may result in the level of low granularity. For example, in order to determine a cell-system specific position, the position-determining system 120 may use a process that includes referring to a database having data that indicates the cell-system a mobile station is operating in. Further, in order to determine a cell/sector specific, the position-determining system 120 may use an AFLT position-determining process. Thus, in this example, two different processes result in the same corresponding granularity of position determination by the position-determining system 120.

ii. Based on which Processing-Duration of the Given Range the Given Processing-Duration is, Selecting a Position-Determining Platform After the request-routing node 122 receives the position-determining request in step 302, the request-routing node 122 makes a determination of which processing-duration of the range the given specified processing-duration is. As noted above, at step 304, based on which processing-duration of the range the given processing-duration received in step 302 is, the request-routing node 122 selects a position-determining platform to process the request. For instance, the request-routing node 122 may select between position-determining platforms 124, 126, 128, and 130. The request-routing node 122 (or another entity in position-determining system 120 or in communication with position-determining system 120) may maintain data that correlates the processing-durations in the given range with respective position-determining platforms. When selecting a position-determining platform to process the received position-determining request, the request-routing node 122 may refer to this data to determine which position-determining platform to select.

Figure 4A:
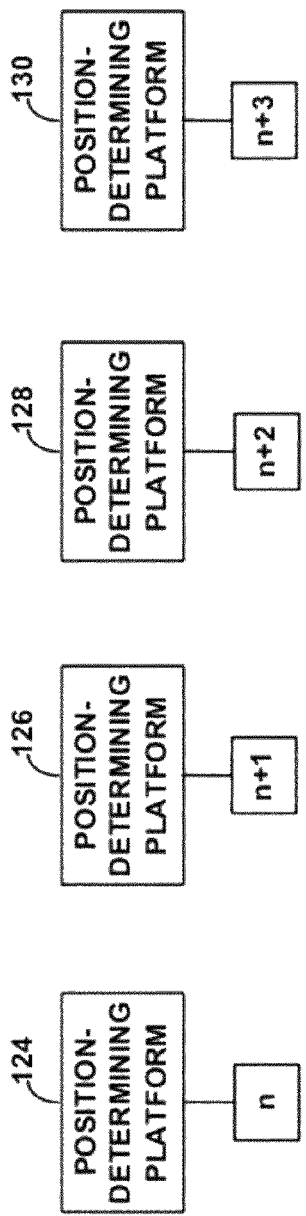
FIGS. 4a and 4b are diagrams depicting exemplary data that correlates processing-durations in a given range with position-determining platforms.
Figure 4B:
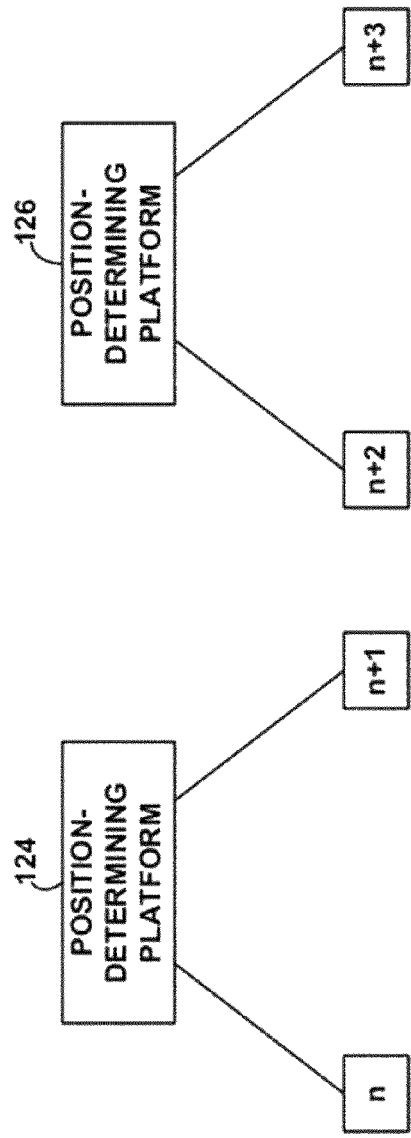

Examples of such correlation data are shown in FIGS. 4a-b. As shown in the example of FIG. 4a, data may correlate each processing-duration in the range with a separate platform. In this example, the given range includes four processing-durations, n to n+3, where n is an integer. As shown, data correlates platform 124 with n, platform 126 with n+1, platform 128 with n+2, and platform 130 with n+3. In a more specific example, the range may be 15-18, and thus the data may correlate platform 124 with 15, platform 126 with 16, platform 128 with 17, and platform 130 with 18. Other examples are possible as well.

In an alternative example, such as the example depicted in FIG. 4b, data may correlate a plurality of processing-durations in the range with the same position-determining platform. In this example, data correlates platform 124 with n and n+1 and platform 126 with n+2 and n+3. In a more specific example, the range may be 1-4, and thus the data may correlate (i) platform 124 with 1 and 2 and (ii) platform 126 with 3 and 4.

The position-determining platforms in position-determining system 120 may be different from one another in terms of various performance metrics. For instance, the platforms may be different from one another in terms of at least one of position-determining processing speed, position-determining processing reliability, position-determining processing cost, and the position-determining process the platform uses.

Regarding position-determination processing speed, some platforms may process requests faster than others. For example, some platforms may be process requests faster than other systems due to more advanced processing capabilities. Regarding position-determining processing reliability, some platforms may be more reliable than others. For instance, some platforms may operate according to a service-level agreement (SLA) that guarantees a pre-determined accuracy, while other platforms have no such guarantee. Regarding position-determining processing cost, some platforms may be more costly than others. For instance, some platforms may charge a wireless carrier more per each position-determining request the carrier sends to the platform for processing. Finally, regarding the position-determining process the platform uses, some position-determining platforms may use different position-determining processes to process received position-determining requests. As discussed above, different position-determining processes may result in the same granularity of position-determination.

iii. Routing the Received Request to the Selected Position-Determining Platform

After selecting the position-determining platform to send the request to, the request-routing node then forwards the given position-determining request to the selected position-determining platform, at step 306. The selected position-determining platform may then process the request. After position is determined, the position-determining system 120 may send the determined position to front end server 123, which may in turn send the determined position to the requesting entity.

5. Example Advantages of the Disclosed System and Method

Beneficially, requesting entities seeking a given granularity may effectively tailor the position-determining request so that the request-routing node 122 selects a particular, desired position-determining platform to which to send the request. Specifically, the requesting entity may select a desired position-determining platform by simply designating a corresponding allowed processing-duration from among those in the range for which all processing-durations in that range define a same corresponding granularity of position-determination by the system 120.

As a particular example of this benefit of the disclosed method, one may refer to the above example of FIG. 4a, where data correlates platform 124 with 15, platform 126 with 16, platform 128 with 17, and platform 130 with 18. In this example, platform 124 may be a platform that is extremely fast, extremely accurate, and extremely expensive. Further, platform 126 may be a platform that is fast, not extremely accurate, and cheap. Still further, platform 128 may be a platform that is slow, cheap, and extremely accurate.

A first requesting entity seeking a high granularity of position-determination may be willing to pay for an extremely fast and extremely accurate position-determination. For example, the first requesting entity may be an entity that provides emergency services (e.g., a 911 call center). Thus, the first requesting entity may specify an allowed processing-duration of 15 in a position-determining request so that the request-routing node 122 sends the request to platform 124.

A second requesting entity seeking a high granularity of position-determination may be willing to sacrifice speed for a cheaper price. For example, the second requesting entity may be a user of a location-based service such as a gaming application that requires frequent and accurate position updates, but that does not require extremely fast position determination. Thus, the second requesting entity may specify an allowed processing-duration of 17 so that the request-routing node 122 sends requests from the second entity to platform 128.

Also, a third requesting entity seeking a high granularity of position-determination may require fast position-determination on a frequent basis. The third requesting entity may therefore desire a platform that is both fast and cheap. Thus, the third requesting entity may specify an allowed processing-duration of 16 so that the request-routing node 122 sends requests from the third entity to platform 126.

In another example of the disclosed method, rather than specified processing-durations defining a desired granularity of position-determination by the system, specified processing-durations may instead define which of a plurality of position-determining processes the system should use to determine position. In such an example, all processing-durations within in a given range, although different from each other, define the same position-determining process that the system should use to determine position. Since the same position-determining process will be used by the system, all processing-durations in this given range will result in the same corresponding granularity of position-determination by the system.

6. Conclusion

Various exemplary embodiments have been described above. Those skilled in the art will understand, however, that changes and modifications may be made to those examples without departing from the scope of the claims.

We claim:

1. In a position-determining system comprising a plurality of position-determining nodes, wherein each of a plurality of position-determining requests received by the system specifies a processing-duration that defines a maximum amount of time that the system should spend determining position and thereby defines a corresponding granularity of position-determination by the system, wherein all processing-durations in a range, although different from each other, define the same corresponding granularity of position-determination by the system, a method comprising:
   receiving into the position-determining system a first position-determining request specifying a first processing-duration, wherein the first processing-duration is within a given range and defines a given corresponding granularity;
   receiving into the position-determining system a second position-determining request specifying a second processing-duration, wherein the second processing-duration is different than the first processing-duration, wherein the second processing-duration is within the given range and defines the same given corresponding granularity;
   based on which processing-duration of the given range the first processing-duration is, the system selecting a first position-determining node of the plurality to process the first position-determining request;
   based on which processing-duration of the given range the second processing-duration is, the system selecting a second position-determining node of the plurality to process the second position-determining request, wherein the second position-determining node is different than the first position-determining node at least in part because the second processing-duration is different than the first processing-duration;
   routing the first position-determining request to the first position-determining node for processing; and
   routing the second position-determining request to the second position-determining node for processing.

2. The method of claim 1, further comprising:
   maintaining data that correlates processing-durations in the given range with respective position-determining nodes, wherein (i) selecting the first position-determining node of the plurality to process the first position-determining request and (ii) selecting the second position-determining node of the plurality to process the second position-determining request comprise referring to the data to determine which position-determining node in the plurality to select.

3. The method of claim 2, wherein the data correlates each processing-duration in the given range with a different position-determining node.

4. The method of claim 2, wherein a plurality of the processing-durations in the given range are correlated with a same position-determining node.

5. The method of claim 2, wherein the data correlates (i) the first processing-duration in the given range with the first position-determining node and (ii) the second processing-duration in the given range with the second position-determining node, wherein the first position-determining node differs from the second position-determining node in terms of at least one of position-determining processing speed, position-determining processing reliability, position-determining processing cost, and position-determining process.

6. The method of claim 1, wherein the given corresponding granularity is a level of high granularity.

7. The method of claim 6, wherein the level of high granularity is a granularity of GPS-specific location.

8. The method of claim 6, wherein the given range is 15-20 seconds.

9. The method of claim 1, wherein the given corresponding granularity is a level of low granularity.

10. The method of claim 9, wherein the level of low granularity is a granularity of cell/sector-specific location.

11. The method of claim 9, wherein the given range is 0 to 4 seconds.

12. In a position-determining system comprising a plurality of position-determining nodes, wherein each of a plurality of position-determining requests received by the system specifies a processing-duration that defines a maximum amount of time the system should spend determining position and thereby defines which of a plurality of position-determining processes the system should use to determine position, wherein all processing-durations in a range, although different from each other, define the same position-determining process that the system should use to determine position, a method comprising:

receiving into the position-determining system a first position-determining request specifying a first processing-duration, wherein the first processing-duration is within a given range and defines a given position-determining process that the system should use to determine position;

receiving into the position-determining system a second position-determining request specifying a second processing-duration, wherein the second processing-duration is different than the first processing-duration, wherein the second processing-duration is within the given range and defines the same given position-determining process that the system should use to determine position;

based on which processing-duration of the given range the first processing-duration is, the system selecting a first position-determining node of the plurality to process the first position-determining request;

based on which processing-duration of the given range the second processing-duration is, the system selecting a second position-determining node of the plurality to process the second position-determining request, wherein the second position-determining node is different than the first position-determining node at least in part because the second processing-duration is different than the first processing-duration;

routing the first position-determining request to the first position-determining node for processing; and routing the second position-determining request to the second position-determining node for processing.

13. The method of claim 12, further comprising:

maintaining data that correlates processing-durations in the given range with respective position-determining nodes, wherein (i) selecting the first position-determining node of the plurality to process the first position-determining request and (ii) selecting the second position-determining node of the plurality to process the second position-determining request comprise referring to the data to determine which position-determining node in the plurality to select.

14. The method of claim 12, wherein the data correlates each processing-duration in the given range with a different position-determining node.

15. The method of claim 12, wherein a plurality of the processing-durations in the given range are correlated with a same position-determining node.

16. The method of claim 12, wherein the data correlates (i) the first processing-duration in the given range with the first position-determining node and (ii) the second processing-duration in the given range with the second position-determining node, wherein the first position-determining node differs from the second position-determining node in terms of at least one of position-determining processing speed, position-determining processing accuracy, position-determining processing reliability, and position-determining processing cost.

17. The method of claim 12, wherein the position-determining process is selected from the group consisting of a position-determining process involving a table lookup of at least one of a most recent cell-system or a most recent cell-site a mobile station was registered in, an AFLT position-determining process, and a GPS position-determining process.

18. A position-determining system comprising:
a plurality of position-determining nodes; and
a request-routing node,
wherein, when the request-routing node receives a first position-determining request, the request-routing node routes the first position-determining request to a first position-determining node for processing,
wherein, when the request-routing node receives a second position-determining request, the request-routing node routes the first position-determining request to a second position-determining node for processing, wherein the second position-determining node is different than the first position-determining node,
wherein the first position-determining request specifies a first processing-duration, wherein the first processing-duration is within a given range and defines a given corresponding granularity,
wherein the second position-determining request specifies a second processing-duration, wherein the second processing-duration is different than the first processing-duration, wherein the second processing-duration is within the given range and defines the same given corresponding granularity,
wherein the request-routing node is configured such that, when the request-routing node receives the first position-determining request, the request-routing node (i) makes a first determination of which processing-duration of the range the first processing-duration is, (ii) based on the first determination, selects a first position-determining node of the plurality to which the request-routing node will route the first position-determining request, and (iii) routes the first position-determining request to the first position-determining node for processing, and
wherein the request-routing node is configured such that, when the request-routing node receives the second position-determining request, the request-routing node (i) makes a second determination of which processing-duration of the range the second processing-duration is, (ii) based on the second determination, selects a second position-determining node of the plurality to which the request-routing node will route the second position-determining request, and (iii) routes the second position-determining request to the second position-determining node for processing.

19. The position-determining system of claim 18, wherein the request-routing node is one of the plurality of position-determining nodes.

20. The position-determining system of claim 18, wherein the given range is a range selected from the group consisting of 0-3 seconds, 4-7 seconds, 8-11 seconds, 12-15 seconds, and 16-60 seconds.

* * * * *